(12) United States Patent
Vertelney et al.

(10) Patent No.: US 6,760,884 B1
(45) Date of Patent: Jul. 6, 2004

(54) INTERACTIVE MEMORY ARCHIVE

(75) Inventors: Laurie J. Vertelney, Palo Alto, CA (US); Baldo A. Faieta, San Francisco, CA (US); Yin Yin Wong, San Francisco, CA (US); Elaine Brechin, San Francisco, CA (US); John P. Pinto, Palo Alto, CA (US)

(73) Assignee: Internal Research Corporation, Palo Alto, CA (US)

( * ) Notice: Subject to any disclaimer, the term of this patent is extended or adjusted under 35 U.S.C. 154(b) by 0 days.

(21) Appl. No.: 09/468,691

(22) Filed: Dec. 21, 1999

Related U.S. Application Data

(60) Provisional application No. 60/147,873, filed on Aug. 9, 1999.

(51) Int. Cl.$^7$ .............................................. G06F 17/00
(52) U.S. Cl. .................................... 715/500.1; 715/530
(58) Field of Search .............................. 715/500, 501.1, 715/512, 530, 500.1; 707/104.1; 382/305, 306

(56) References Cited

U.S. PATENT DOCUMENTS

| | | | | |
|---|---|---|---|---|
| 5,119,474 A | * | 6/1992 | Beitel et al. .............. 715/500.1 |
| 5,202,828 A | | 4/1993 | Vertelney et al. ........... 364/419 |
| 5,274,758 A | * | 12/1993 | Beitel et al. .............. 715/500.1 |
| 5,341,293 A | | 8/1994 | Vertelney et al. ....... 364/419.17 |
| 5,383,029 A | * | 1/1995 | Kojima ....................... 358/403 |
| 5,898,434 A | | 4/1999 | Small et al. ................ 345/348 |
| 6,072,980 A | * | 6/2000 | Manico et al. .............. 434/317 |
| 6,147,742 A | * | 11/2000 | Bell et al. ..................... 355/27 |
| 6,154,755 A | * | 11/2000 | Dellert et al. ............... 715/526 |
| 6,182,090 B1 | * | 1/2001 | Peairs ........................ 715/500 |
| 6,288,719 B1 | * | 9/2001 | Squilla et al. .............. 345/805 |
| 6,349,194 B1 | * | 2/2002 | Nozaki et al. .............. 434/308 |
| 6,356,923 B1 | * | 3/2002 | Yano et al. ................. 717/127 |
| 6,389,181 B2 | * | 5/2002 | Shaffer et al. .............. 382/305 |
| 6,408,301 B1 | * | 6/2002 | Patton et al. ............... 707/102 |
| 6,425,525 B1 | * | 7/2002 | Swaminathan et al. ..... 235/385 |
| 6,434,579 B1 | * | 8/2002 | Shaffer et al. .............. 715/520 |
| 6,453,078 B2 | * | 9/2002 | Bubie et al. ................ 382/305 |
| 6,563,563 B2 | * | 5/2003 | Adams et al. ................ 355/31 |
| 6,580,438 B1 | * | 6/2003 | Ichimura et al. ............ 345/732 |
| 2001/0045463 A1 | * | 11/2001 | Madding et al. ....... 235/462.14 |
| 2003/0093493 A1 | * | 5/2003 | Watanabe et al. ........... 709/217 |

FOREIGN PATENT DOCUMENTS

EP     0 926 879 A2     6/1999     ............ H04N/1/32

* cited by examiner

Primary Examiner—Sanjiv Shah
(74) Attorney, Agent, or Firm—Van Pelt & Yi LLP

(57) ABSTRACT

An authoring system and procedure for organizing photos (and other physical object types) are provided. Using the authoring system, an author organizes a set of physical objects into a particular story through an interface. Each physical object is associated with a specific identifier, such as a barcode, and the author uses an input device to scan identifiers of selected physical objects that are to be included within the particular story. The authoring process is performed off-line. Using the input device, the author adds her own commentary as part of building the story. For example, she can associate an audio clip with a particular physical object that makes up the story or with the entire story itself. In one embodiment, the input device includes a microphone for receiving voice input, as well as a barcode reader for scanning a particular barcode of a selected physical object. The author also selects one or more presentation styles that will be used to display the entire story. In one embodiment, each story and its related components are stored within the input device. After the author generates one or more stories via the input device, the author's input is transformed into one or more stories that are displayed on a computer (e.g., via a world wide web page) such that others may view the authored stories. Each story may include reproductions of the physical objects that were included in the particular story. For example, digitized copies of several related photos are displayed sequentially. The authors annotations (e.g., audio clips) are also displayed or played along with the physical object reproductions.

22 Claims, 9 Drawing Sheets

```
<story id="5678">
    <author id="999" />
    <timestamp>03/28/1999 12:00:00</timestamp>
    <links>
    <a nref="1234" />
    <a nref="3256" cnref="1234" />
    <a nref="1235" />
    <a nref="3257" cnref="1235 />
    </links>
</story>
```
⎯ 601

```
<author id="999" name="Laurie Vertelney" >
    ....
</author>
```
⎯ 603

```
<photo id="1234">
    <author id="999" />
    <timestamp>03/28/1999 12:00:00</timestamp>
    <media>
        <img resolution="hi-res" src="http://legacy.com/images/076_LRG.JPG" />
        <img resolution="MED-res" src="http://legacy.com/images/076_MED.JPG" />
            <img resolution="low-res" src="http://legacy.com/images/076_SML.JPG" />
        </media>
</photo>
```
⎯ 605

```
<audio-clip id="3256">
    <author id="999" />
    <timestamp>05/24/1999 15:30:00</timestamp>
    <media>
        <audio src="http://legacy.com/audio/a999_45.rm" />
    </media>
</audio-clip>
```
⎯ 607

Figure 6

INTERACTIVE MEMORY ARCHIVE

CROSS REFERENCE TO RELATED APPLICATIONS

This application claims priority to Provisional U.S. Patent Application, having Application No. 60/147,873 filed Aug. 9, 1999 entitled, "Off-line physical authoring of family story web sites" by Vertelney et al., which application is incorporated by reference in its entirety.

BACKGROUND OF THE INVENTION

The invention relates to apparatus and methods for presenting photographs and their associated stories. More specifically, it relates to mechanisms for organizing photographs on a web site. The present invention may also be applied to the representation and organization of any physical object on a web site.

There are several ways that an individual may collect and display photographs. For example, one may collect photographs over a period of time. The collection of photos may then be manually organized and inserted within a photo album. The individual typically selects an order and grouping of the photos within the photo album. For example, the individual may group together a set of photos about a family member's birthday party. By way of another example, photos may be arranged sequentially by time.

The photo album approach has several disadvantages. First, after an individual selects the order and grouping of the photos, she must then spend a large amount of time manually inserting the photos within the album itself. If she changes her mind regarding the order or grouping of the photos, she may have to remove photos from the album to rearrange them. This task also is typically time consuming. In sum, organizing a photo album is a burdensome task.

Additionally, since an individual typically only compiles one copy of a particular photo album, she usually wants to keep possession of the photo album. Consequently, it is difficult to share the photo album. For example, she may share her album with people when they are present within her home or she may physically carry the album to another person's home. The album author is typically unwilling to ship the album to another person because the author does not wish to risk losing the album.

With the prevalence of home computers having Internet access, many photo enthusiasts are digitizing their photos and displaying them on a world wide web page. An individual digitally scans her photos (or uses a digital camera or a photo CD) to form digital files, such as JPEG files. She then generates a web page using HTML tagging language, for example. Specifically, she uses HTML tags to include links to the digital files within her web page. To organize her photos in a particular arrangement, she selects an appropriate set of HTML tags.

Although this approach allows an individual to share her photos with an unlimited number of people without the risk of giving up her own copy of the photos, the typical photo enthusiast may not have the skill or time to design her own web page. Designing a web page is typically a complex and time consuming process. That is, the web page designer has to learn how to use the HTML tagging language, or some other language that is recognized by a browser. In sum, the typical consumer is unable or unwilling to design her own web page for displaying photos.

Thus, improved mechanisms for organizing photographs are needed. More specifically, mechanisms that allow an individually to easily organize photos without investing a large amount of time or technical know-how are needed.

SUMMARY OF THE INVENTION

Accordingly, the present invention addresses the above problems by providing a user-friendly interface and procedure for organizing photos, as well as other types of physical objects. In general terms, the present invention provides mechanisms that may be utilized by an author to generate stories made of or about physical objects, such as photographs. The author organizes a set of physical objects into a particular story through an easy to use interface. In one embodiment, each physical object is associated with a specific barcode, and the author simply uses the input device to scan barcodes of selected physical objects that are to be included within the particular story. The authoring process may be performed off-line.

Using the input device, the author may also add her own commentary as part of building the story in a number of unique ways. For example, she can associate an audio clip with a particular physical object that makes up the story or with the entire story itself. In one embodiment, the input device includes a microphone for receiving voice input, as well as a barcode reader for scanning a particular barcode of a selected physical object. The author may also select one or more presentation styles that will be used to display the entire story. For example, the author may select a particular border to be displayed around each photo within the photo story.

In one embodiment, each story and its related components are stored within the input device. For example, each component of a particular story may be stored within an edit list for that particular story. In one aspect, each photo barcode and audio clip is sequentially stored within the corresponding story's edit list.

After the author generates one or more stories via the input device, the author's input is transformed into one or more stories that are displayed on a computer (e.g., via a world wide web page) such that others may view the authored stories. Each story may include reproductions of the physical objects that were included in the particular story. For example, digitized copies of several related photos are displayed sequentially. The authors annotations (e.g., audio clips) are also displayed or played along with the physical object reproductions.

In one embodiment, an apparatus for organizing photographs, each photograph being digitized and stored within a database is disclosed. Each digitized photograph has an associated identifier, and each identifier is also in a physical form that is readable by an input device. The apparatus includes an input device having an image reader arranged to read one or more identifiers that include one or more photo identifiers associated with selected photographs, a data recorder arranged to receive annotation data related to each digitized photograph, and a memory device arranged to store information based on such reading and receipt. The apparatus further includes an interface device arranged to transfer the stored information from the input device to the database such that the photographs that correspond to the stored information are accessible and displayable.

In another embodiment, a data structure suitable for storing information useful in displaying photographs is disclosed. The data structure is embodied in a computer readable media and includes a plurality of photograph elements each having a photograph identifier and a reference to a digitized photograph that is associated with the photograph identifier. The data structure also includes a plurality of story elements each having a story identifier and one or more photograph identifiers. The story elements correspond to selected digitized photographs that are played when the corresponding story element is accessed.

In another aspect, the invention pertains to a method of organizing photographs off-line. Each photograph is digitized and stored within a media database. A representation of each digitized photograph is provided, and each representation is readable by an input device to identify the corresponding digitized photograph. Off-line from a computer, a selected one of the representations is received into the input device so that the representation is stored within the input device. The representation within the input device is transferred to a story database in a format that is accessible to display the corresponding digitized photograph.

In another embodiment, the invention pertains to a computer program product for organizing photographs off-line. Each photograph is digitized and stored within a media database. The computer program product includes at least one computer readable medium and computer program instructions stored within the at least one computer readable product for causing a processing device to perform the above described operations.

In yet another embodiment, a authoring system for presenting a story about tagged physical objects on an accessible computer site is disclosed. The authoring system includes a reader arranged to read selected tags of the tagged objects and a processor arranged to convert such selections into a story element having object identifiers associated with the selected tagged objects. The object identifiers correspond to images and the group forms a story about the selected tagged objects. The authoring system also includes a computer interface arranged to transfer the story element to the computer site so that a user may access the computer site and view the story element's associated images.

The present invention has several associated advantages. For example, the authoring system of the present invention allows off-line authoring of photo albums. The author may utilize a user-friendly input device to easily scan barcodes of photographs to create a story. The author may also utilize the input device to add her own commentary regarding each photo as part of building the story. The completed story may then be automatically formatted and downloaded to a relational database from which the completed story may be accessed and viewed. The author does not have to have any technical expertise in database management or HTML, for example, to create digitally displayable stories since the story content may be automatically formatted and downloaded to the database and reformatted as HTML when sent back to be seen in the display device.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

That is.

FIG. 6 illustrates an example of a XML story element and its associated XML content elements in accordance with one embodiment of the present invention.

DETAILED DESCRIPTION OF SPECIFIC EMBODIMENTS

Reference will now be made in detail to the specific embodiments of the invention. Examples of these specific embodiments are illustrated in the accompanying drawings. While the invention will be described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

FIGS. 1A through FIG. 6 illustrate embodiments of the present invention as applied to a photograph organization system or photo story authoring system. That is, an organization system is described as being utilized to arrange photos into a story. However, it should be understood that the present invention may also be utilized to organize any type and number of physical objects into a theme or story. For example, one may utilize the organization system to author a story about her family heirlooms or about selected objects within her home. Furthermore, other types of arrangement types, besides stories, are contemplated, such as magazine articles arranged into a compilation. Audio narration specific to the objects or to the story may also be added to enhance the story or compilation. The resultant story or compilation may then be presented on any suitable display, such as on a computer display, television screen or even a cell phone display. In the illustrated embodiment, when a photo story is displayed, its associated photos are sequentially presented in the arranged order.

Figure 1A:
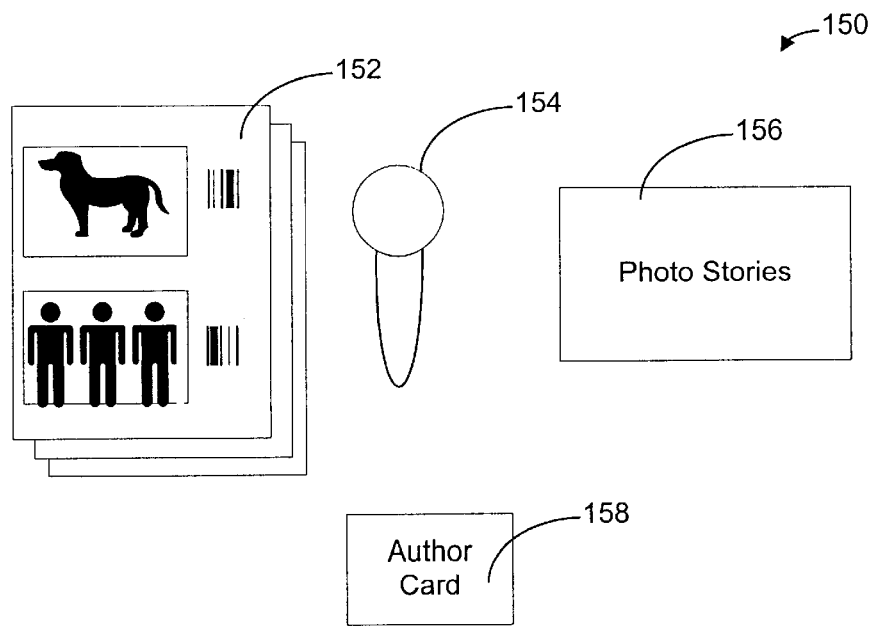
FIG. 1A is a diagrammatic representation of an input system for authoring a story in accordance with one embodiment of the present invention.

FIG. 1A is a diagrammatic representation of an input system 150 for authoring a story in accordance with one embodiment of the present invention. As shown, the input system 150 includes an input device or wand 154, a plurality of contact sheets 152, an author card 158, and a photo story book 156. The wand 154 is utilized to select objects to be included within a particular story. The wand may include any suitable combination of hardware and software to facilitate organization of physical objects into a story. In one embodiment, the wand is configured to scan barcodes associated with the other objects (barcodes from photos or the contact sheets 152, a barcode from the author card 158, and a barcode from the story book 156) of the input system 150. Several embodiments of a wand are described further below with reference to FIG. 7.

The wand is also used to input other relevant data that may enhance the story, such as audio commentary associated with each photo. In one embodiment, the wand includes mechanisms for recording sound and associating such recordings with one or more photos or with the entire story.

The wand may also include control mechanisms for playing back parts of a story. Aspects of the story, such as audio, may be played from the wand itself. In one embodiment, the wand includes a record button, a stop button, and an erase button. For example, as an author creates a story, she may listen to the most recently recorded message as it automatically plays back after recording. The author may erase the last recorded message by hitting the erase button. The author may also stop playback of the message by hitting the stop button, e.g., if she is satisfied with the message and wants to continue authoring other photos.

The wand may control display of an entire story on any suitable display device, such as a computer display or a television screen. That is, the wand may include mechanisms for controlling how the story is played (e.g., via a pause and play button). In sum, the input system 150 may also function to control display of at least a portion of the completed stories. Alternatively, display barcodes may be utilized to control display of the completed stories.

Figure 7:
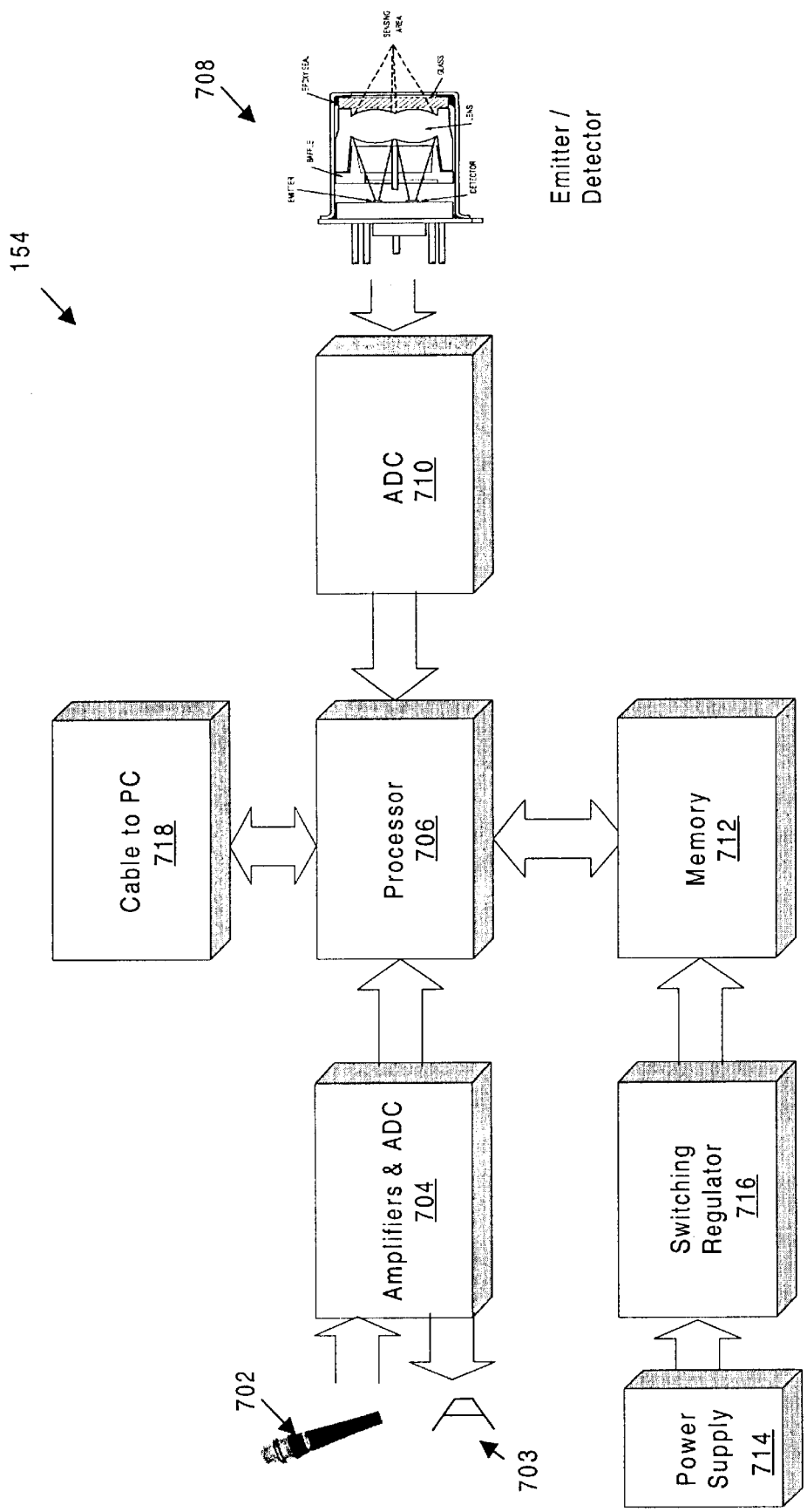
FIG. 7 is a diagrammatic representation of the input device or wand of FIGS. 1A, 1B, and 2 in accordance with one embodiment of the present invention.

FIG. 7 is a diagrammatic representation of the input device or wand 154 in accordance with one embodiment of the present invention. As shown, the wand 154 includes a power source 714 and switching regulator 716 for providing power to the wand 154 components. The wand also includes an amplifier and analog to digital converter (ADC) block 704, and a processor 704 for receiving input from a voice input device, such as microphone 702, and analyzing the voice data. The amplifier and ADC block 704 amplifies and digitizes the received analog voice signals. The digital voice data may then be sent to processor 706. The processor 706 is configured to compress the voice data, for example, into an audio file. The audio file may be decompressed (or digital voice data) and then played back though one or more speakers 703.

The wand 154 also includes components for receiving and analyzing barcode information: an emitter and detector block 708, a second ADC block, and processor 706. In general terms, the emitter/detector block 708 includes an emitter that outputs a signal across a barcode as the wand 154 is scanned across a barcode. The emitted signal is scanned across the barcode and reflected back to a detector within the emitter/detector block 708. The barcode value affects the reflected signal so that the barcode number may be determined from the reflected signal. The reflected signal is digitized by analog block 710 and sent to the processor 706 for analysis to determine the barcode number.

The emitter/detector may be configured to read one-dimensional, as well as two dimensional barcodes or symbols. In an alternative embodiment, a camera is utilized to read an image that represents an index or number. The image may be any suitable format for identifying a physical object. For example, the image may be typed numbers or other symbols that represent numbers.

The processor 706 analyses voice data from amplifiers and ADC block 704 and barcode data from ADC block 710. By way of example, the processor 704 is configured to compress voice data into one or more audio files and compile the barcode data into a data structure or edit list. The wand 154 may also include one or more memory devices 712 for storing such audio file and/or edit list (or data structure). The memory device(s) 712 may also store information for decoding the barcode signal. The processor may also be configured to associate one or more barcode numbers with a particular set of audio data. For example, when a barcode is scanned, the processor 704 is configured to match any subsequently entered voice data with the barcode number. References to the audio files may also be inserted within the edit list and associated with one or more barcode numbers from specific physical objects (e.g., photographs). The compiled edit list may then be sent to a computer system via a "cable to PC" interface 718.

Turning back to FIG. 1A, the story book 156 is configured to allow the author to begin authoring or modifying a particular story. Additionally, the author may use the story book 156 to select a particular story to be displayed. The storybook may be configured in any suitable manner to allow selection and identification of a particular story. In one embodiment, the story book 156 includes a plurality of barcodes (shown in FIG. 2). The user may select a particular barcode to be associated with a story that she is about to author. If the user does not select a story barcode, a barcode number may be automatically assigned (e.g., when the story is uploaded). Each barcode may also have an associated label to identify the story. For example, the author may write a brief title (e.g., "Mom's $50^{th}$ Birthday Story") for the associated story. Later, when the author wishes to select and play a completed story, she may utilize the labels to identify and scan the associated barcode.

The author card 158 is utilized to identify the particular author of the story. For example, the author card may include a bar code to identify the particular author. The author scans the author card 158 that identifies her prior to authoring a story. The author's unique barcode may be utilized to determine where the story may be stored (i.e., associated with that author) and from where the story may be displayed (e.g., from the author's web page). In one embodiment, if an author barcode is not scanned, a default user number associated with the wand may be utilized.

Figure 1B:
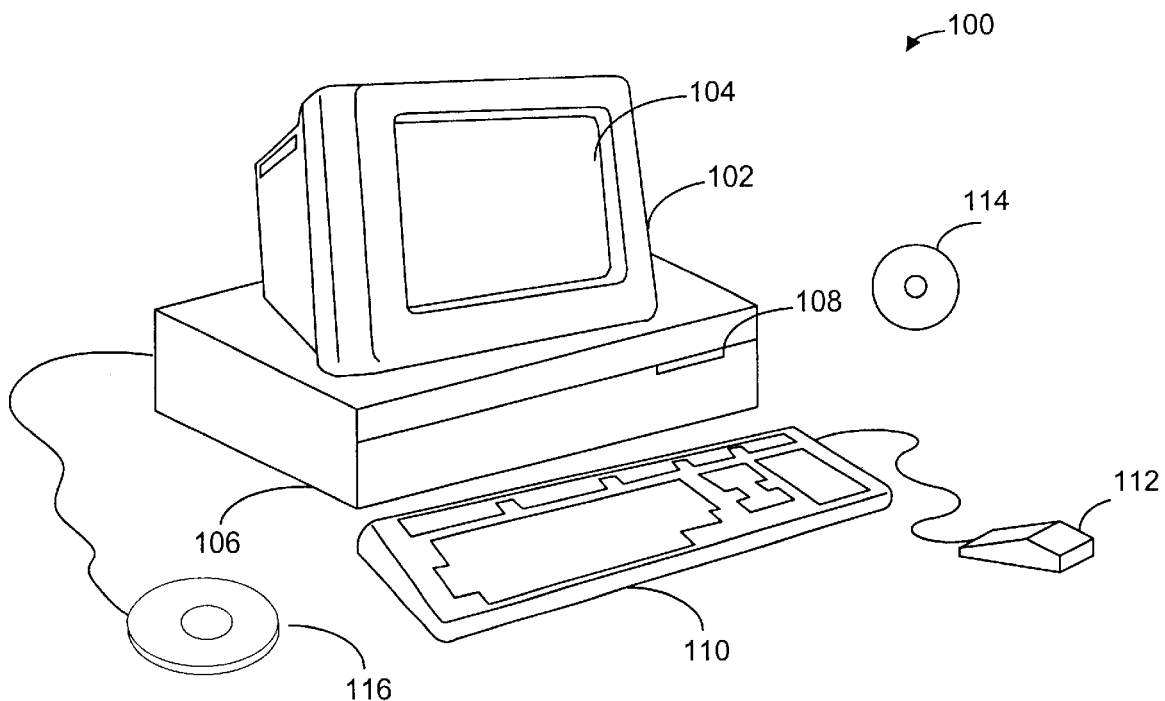
FIG. 1B illustrate a computer system suitable for receiving the story data from the wand of FIG. 1A in accordance with one embodiment of the present invention.

FIG. 1B illustrates a computer system 100 suitable for receiving the story data from the wand 154 of FIG. 1A in accordance with one embodiment of the present invention. FIG. 1B shows one possible physical form of the computer system. Of course, the computer system may have many physical forms ranging from an integrated circuit, a printed circuit board and a small handheld device up to a huge super computer. Computer system 100 includes a docking cable 116 (or docking bay), a monitor 102, a display 104, a housing 106, a disk drive 108, a keyboard 110 and a mouse 112. Disk 114 is a computer-readable medium used to transfer data to and from computer system 100. Information from the wand 154 may be transferred to computer system 100 via any suitable mechanism. In the illustrated embodiment, the docking cable 116 is configured to plug into the wand 154 and to transfer data from the wand to the computer system 100. The wand 154 may include a serial, parallel or USB interface that is configurable to be inserted within a serial or parallel port of the computer system 100.

Figure 2:
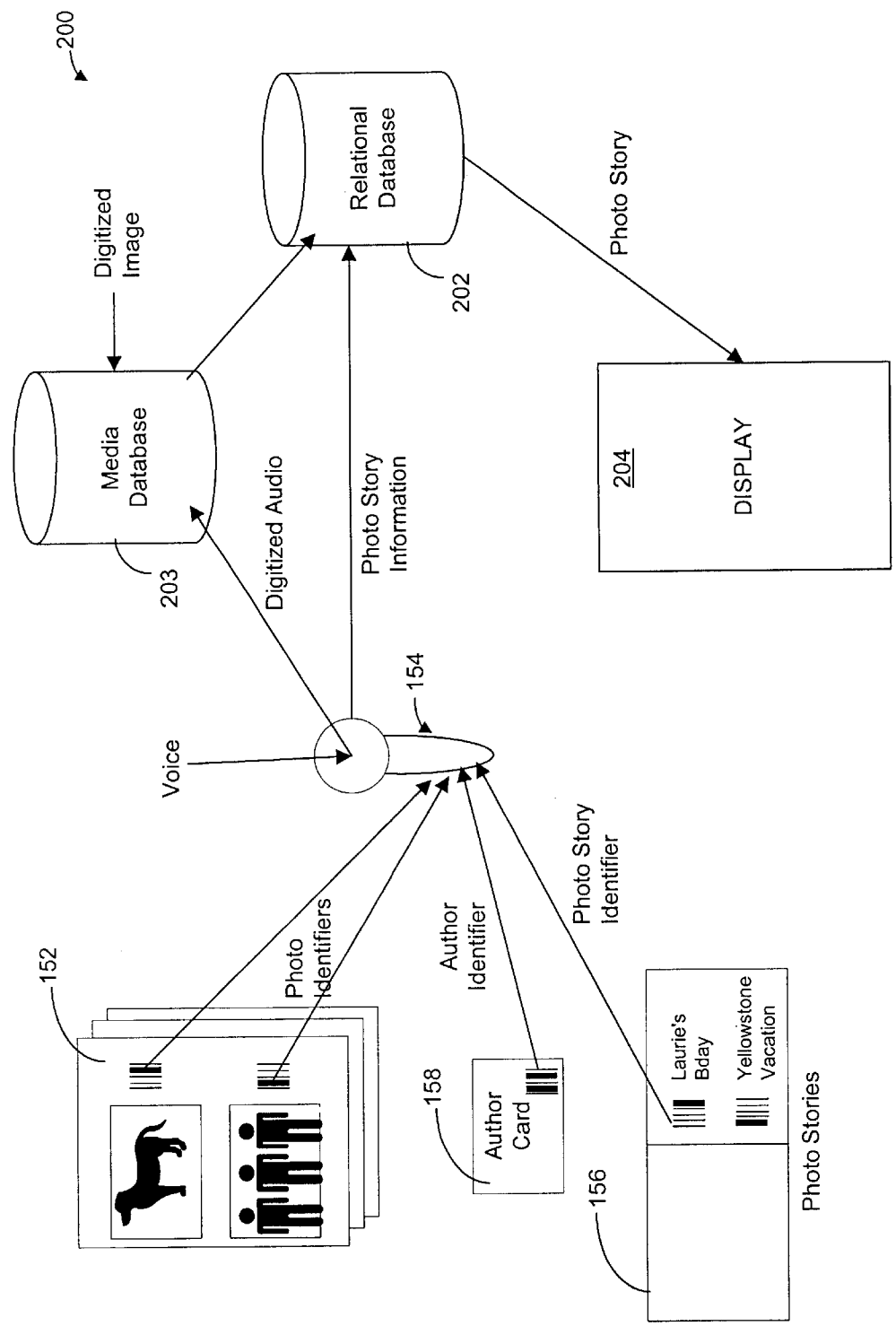
FIG. 2 is a logical diagram of an example flow of information in accordance with one embodiment of the present invention.

FIG. 2 is a logical diagram of an example flow of information 200 in accordance with one embodiment of the present invention. As discussed above, the wand 154 receives information related to one or more photo stories. As shown, one or more photo identifiers (e.g., photo barcodes), an author identifier (e.g., author barcode), one or more photo story identifiers (e.g., story barcodes), and voice may be input to the wand 154. A photo identifier may be selected from any suitable source. As shown, the photo identifiers are scanned from the plurality of contact sheets 152. Each contact sheets has a plurality of photo images that each have an associated photo barcode. In one embodiment, the author takes her film to a processing center. The processing center generates the contact sheet from her film and assigns bar codes to each photo within the contact sheet. The processing center also stores image files and associated indices which are the numbers encoded in the barcodes for each photo within media data 203 so that the image files may be later accessed via its associated index. Of course, the photo identifiers may be located anywhere as long as they can be associated with particular photos. For example, photo identifiers may be located on the backs of photos.

In one embodiment, several authors may add content to a single story. For example, the contact sheet may be printed out by multiple authors so that each author may use his or her own wand to add content to a single story. Additionally, the contact sheets can be printed out by other users so that they can create their own original stories. Authors may also select photos to generate a story from a common web site with a keyboard, mouse or any suitable input device.

Likewise, the author identifier may take any suitable form. As shown, the author card contains a readable barcode whose index corresponds to a particular author in the relational database. Alternatively, the wand may be configured to automatically associate a particular author identifier (e.g., which identifies the wand owner) with the author. The photo story identifiers may also have any suitable form. As shown, the photo story book 156 includes a plurality of barcodes that are associated with labels. The author may scan a selected barcode that has an empty label. The selected barcode is then associated with the story that is currently being authored. The author may also write on the label associated with the selected barcode to facilitate correlation between the selected barcode and the authored story. Alternatively, a story barcode is optional and a story identifier number is automatically selected or generated when the story content is completed or uploaded. An alternative to a story book is a plurality of barcodes that are printed onto sticky labels and then applied to a photo album or any other physical object.

The wand 154 is also configured to organize a set of input identifiers and voice data into photo story information that is output to relational database 202. The voice data itself may be formatted (e.g., digitized and compressed) into digitized audio data that is output to media database 203, which also contains digitized image data. The photo story information is formatted so that each photo story identifier may be associated with an author identifier, one or more photo identifiers (and corresponding image files) and corresponding audio clips. Several embodiments of a data structure or edit list for organizing the photo story information are described below with reference to FIG. 6.

The photo story information may then be accessed from the relational database 202 to present the story on display 204. For example, the story information contains references to one or more image and audio files, which are stored in a media database 203. The image files referenced by the story information are displayed, and the corresponding audio clips referenced by the story information are played on display 204.

The story information may be accessed and played via any suitable mechanism. In a preferred embodiment, the story is accessible via the author's web page. The author compiles any number and type of stories or compilations. The completed stories are then transferred to the relational database 202 in the form of story elements. In one embodiment, other authors may also contribute story elements to the relational database 202. Alternatively, each author may contribute stories to her own database. The story elements that belong to a particular author are accessible through that particular author's web site. Other authorized viewers may then access the author's web page to see and hear the author's stories.

Figure 3:
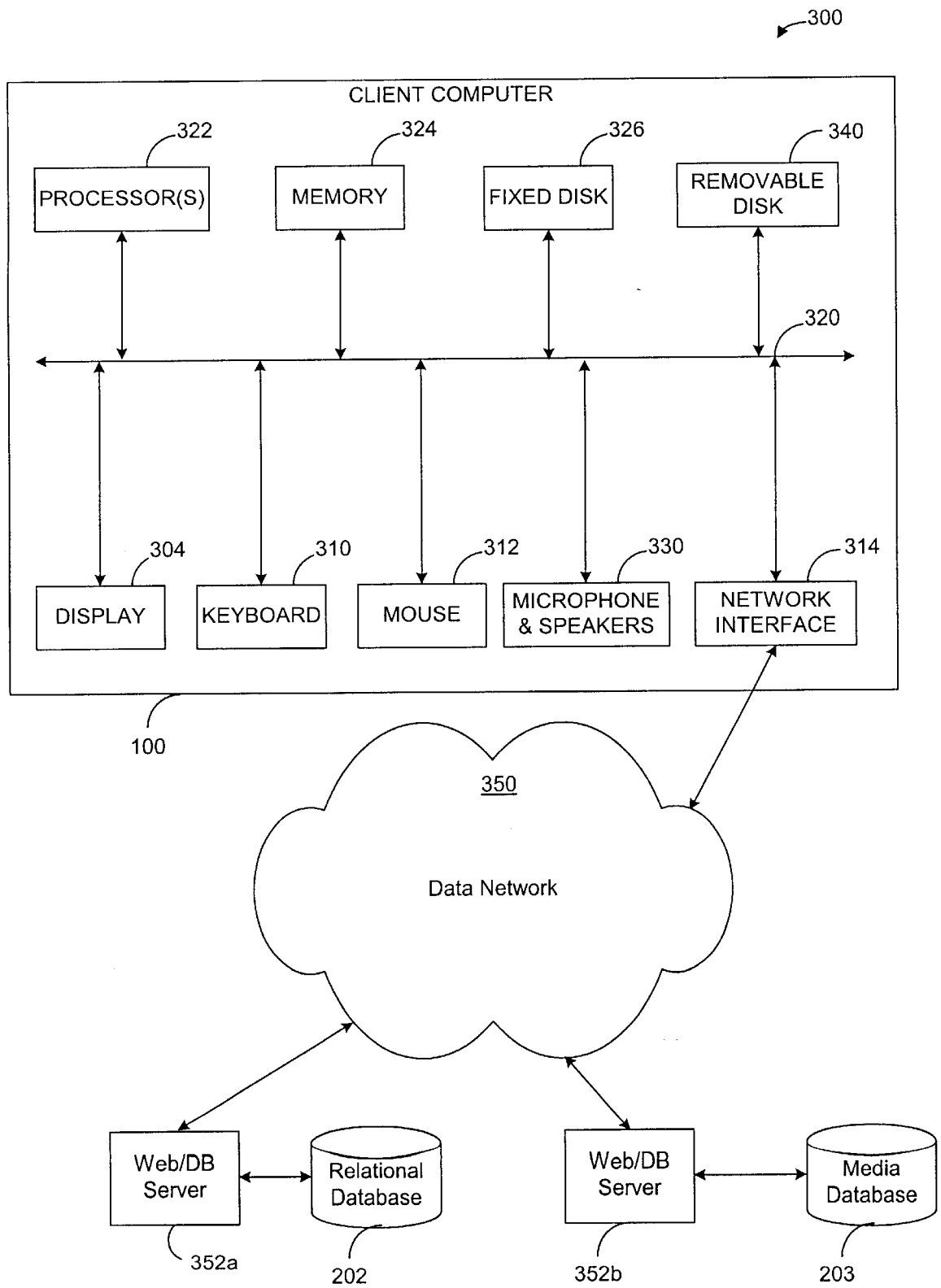
FIG. 3 is a diagrammatic representation of a computer network through which stories may be compiled by authors and presented to viewers in accordance with one embodiment of the present invention.

FIG. 3 is a diagrammatic representation of a computer network 300 through which stories may be compiled by authors and presented to viewers in accordance with one embodiment of the present invention. The network includes a plurality of nodes: a client computer 100, a web server 352*a*, and a media server 252*b*. The nodes are coupled through data network 350.

A computer network is generally in the form of a geographically distributed collection of interconnected communication links for transporting data between nodes, such as computers. By definition, a network is a group of computers and associated devices that are connected by communications facilities or links. Network connections can be of a permanent nature, such as via cables, or can be of a temporary nature, such as connections made through telephone or other communication links. A plurality of computer networks may be further interconnected by intermediate nodes, or routers, to extend the effective "size" of the networks, smaller portions of which may be maintained as autonomous domains of nodes. A router is a computer system that stores and forwards data packets from one local area network (LAN) or wide area network (WAN) to another. Routers see the network as network addresses and all the possible paths between them. They read the network address in a transmitted message and can make a decision on how to send it based on the most expedient route (traffic load, line costs, speed, bad lines, etc.). Routers typically communicate by exchanging discrete "packets" of data according to predefined protocols. In this context, a protocol comprises a set of rules defining how the nodes interact with each other.

Networks vary in size, from a local area network (LAN) consisting of a few computers and related devices, to a wide area network (WAN) which interconnects computers and LANS that are geographically dispersed. An internetwork, in turn, is the joining of multiple computer networks, both similar and dissimilar, by means of gateways or routers that facilitate data transfer and conversion from various networks. A well known abbreviation for internetwork is internet. As currently understood, the capitalized term Internet refers to the collection of networks and gateways that uses a Transmission Control Protocol/Internet Protocol (TCP/IP). The Internet has recently seen explosive growth by virtue of its ability to link computers located throughout the world.

Referring back to FIG. 3, an example logic diagram of the client computer 100 of FIG. 1B is illustrated. A wide variety of subsystems are attached to system bus 320. Processor(s)

322 (also referred to as central processing units, or CPUs) are coupled to storage devices including memory 324. Memory 324 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable type and number of the computer-readable media described below.

A fixed disk 326 is also coupled bi-directionally to CPU 322; it provides additional data storage capacity and may also include any of the computer-readable media described below. Fixed disk 326 may be used to store programs, data and the like and is typically a secondary storage medium (such as a hard disk) that is slower than primary storage. It will be appreciated that the information retained within fixed disk 326, may, in appropriate cases, be incorporated in standard fashion as virtual memory in memory 324. Removable disk 340 may take the form of any of the computer-readable media described below.

CPU 322 is also coupled to a variety of input/output devices such as display 304, keyboard 310, mouse 312 and a set of speakers and microphone 330. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 322 optionally may be coupled to another computer or telecommunications network using network interface 314. With such a network interface, it is contemplated that the CPU might receive information from the network, or might output information to the network in the course of performing the above-described method steps. Furthermore, method embodiments of the present invention may execute solely upon CPU 322 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

After story information is transferred to the client computer 300 (e.g., via docking bay 116), the story information may reside within the memory 324 or fixed disk 326. The story information may then be transmitted via network interface 314, through network 350, to relational database 202. The story information may be transmitted in any suitable format that facilitates the organization of data into accessible structures. For example, the story information may have an XML, HTML, or SQL format. Several examples of XML formatted story information are described below with reference to FIG. 6. XML format generally provides rules for tagging groups of information within a file. The story information stored in an XML record when loaded into a relational database is distributed among several relational tables and corresponds to writing sets of SQL formatted records. Media files (e.g., audio clips) that are referenced by the story information may also be transmitted to media database 203.

The story information and the media data may be stored in any number and type of databases. As illustrated, the story information is stored separately from the media data. However, the story information and media data may be stored together, or the story information and/or media data may be each stored in multiple databases. Each database may be accessed via an associated server. As shown, the relational database 202 is accessed via web and database server 352a, and the media database 203 is accessed via web and database server 352b. The servers are configured to interface with other nodes through network 350, as well as their respective databases. In other words, data may be written to a database through the associated server. Likewise, data may be read from a database through its associated server.

Figure 4A:
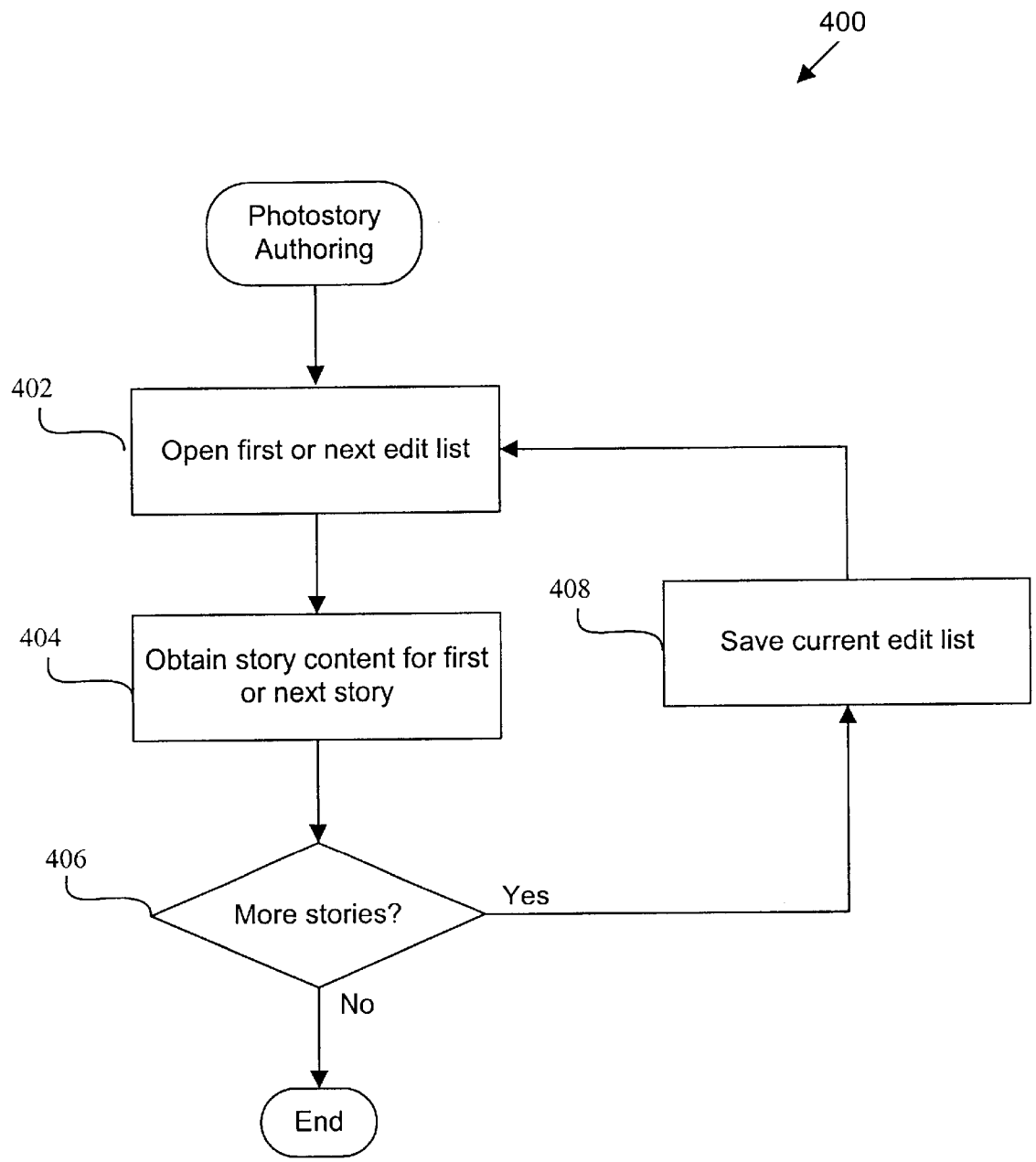
FIG. 4A is a flow chart illustrating a process for authoring, one or more stories in accordance with one embodiment of the present invention.
Figure 4B:
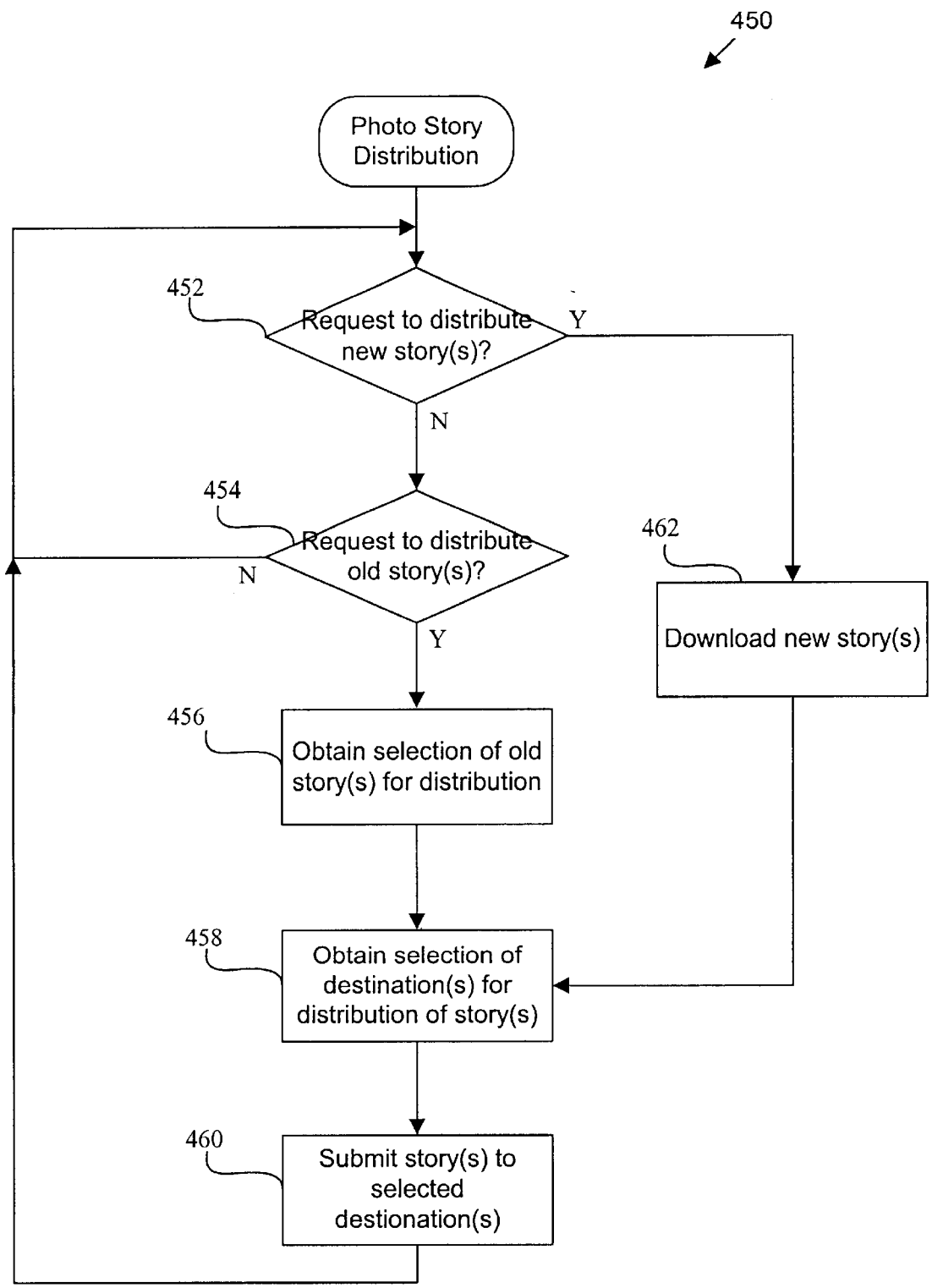
FIG. 4B is a flow chart illustrating a process for distributing one or more stories in accordance with one embodiment of the present invention.
Figure 4C:
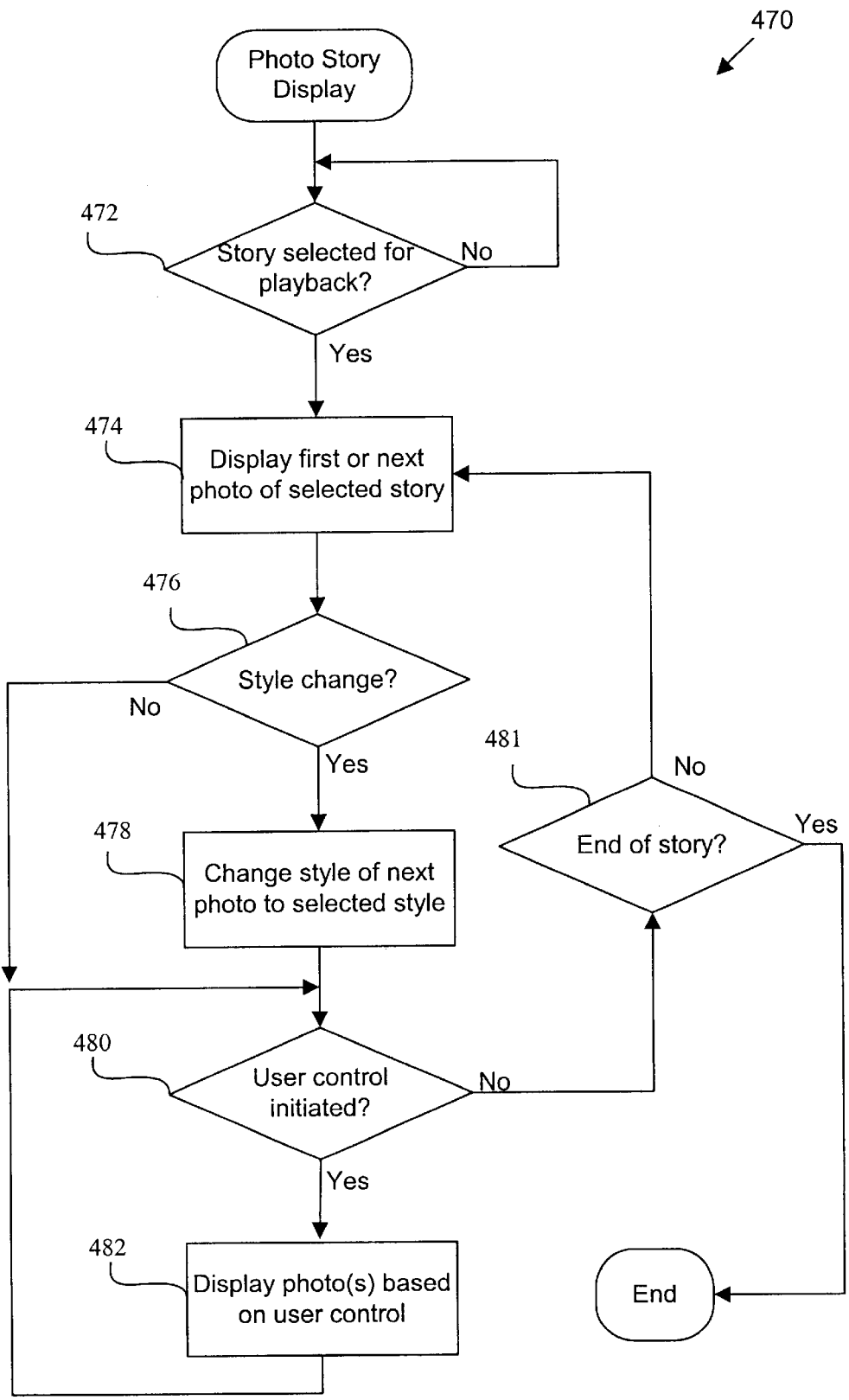
FIG. 4C is a flow chart illustrating a process for displaying a completed story in accordance with one embodiment of the present invention.

FIGS. 4A, 4B, and 4C are flowcharts illustrating example processes of authoring a photo story, distributing a completed photo story, and displaying a completed photo story, respectively. In general terms, a story may be authored off-line using the wand. The wand is used to select and create components, such as photos and audio clips, of a particular story. The story and its components may then be downloaded to any suitable destination that is accessible by others, such as a secure web site. The story components may then be displayed sequentially like a slideshow.

Any suitable mechanism may be utilized for facilitating the authoring process. FIG. 4A is a flow chart illustrating a process 400 for authoring one or more stories in accordance with one embodiment of the present invention. Initially, a first edit list is opened in operation 402. In one embodiment, the wand includes software that is configured to create an XML edit list for each group of story components. Alternatively, such software may reside on a computer that is separate from the wand. That is, story components for the first story will be stored within the first edit list; story components for the second story (if any) will be stored within a second edit list, etc.

Story content is then obtained for the first story in operation 404. For example, an author may select which photos and their sequence within a first story. The author may also add voice to one or more photos as part of "telling" a story about the photos. Any suitable mechanisms may be provided to allow the author to select story content off-line. For example, the wand may be configured with a barcode reader and a sound recorder. The author uses the bar code reader to scan a unique story barcode and then to scan a plurality of photo barcodes that are associated with such story barcode. After a particular photo barcode is scanned, the author may record an audio message to be associated with the preceding photo. The selected story and photo barcodes, as well as references to any recorded audio message(s), are stored within the current edit list. The selected photo barcodes encode indices in the relational database and correspond to digital image files of those photos stored within the media database 203.

Figure 5:
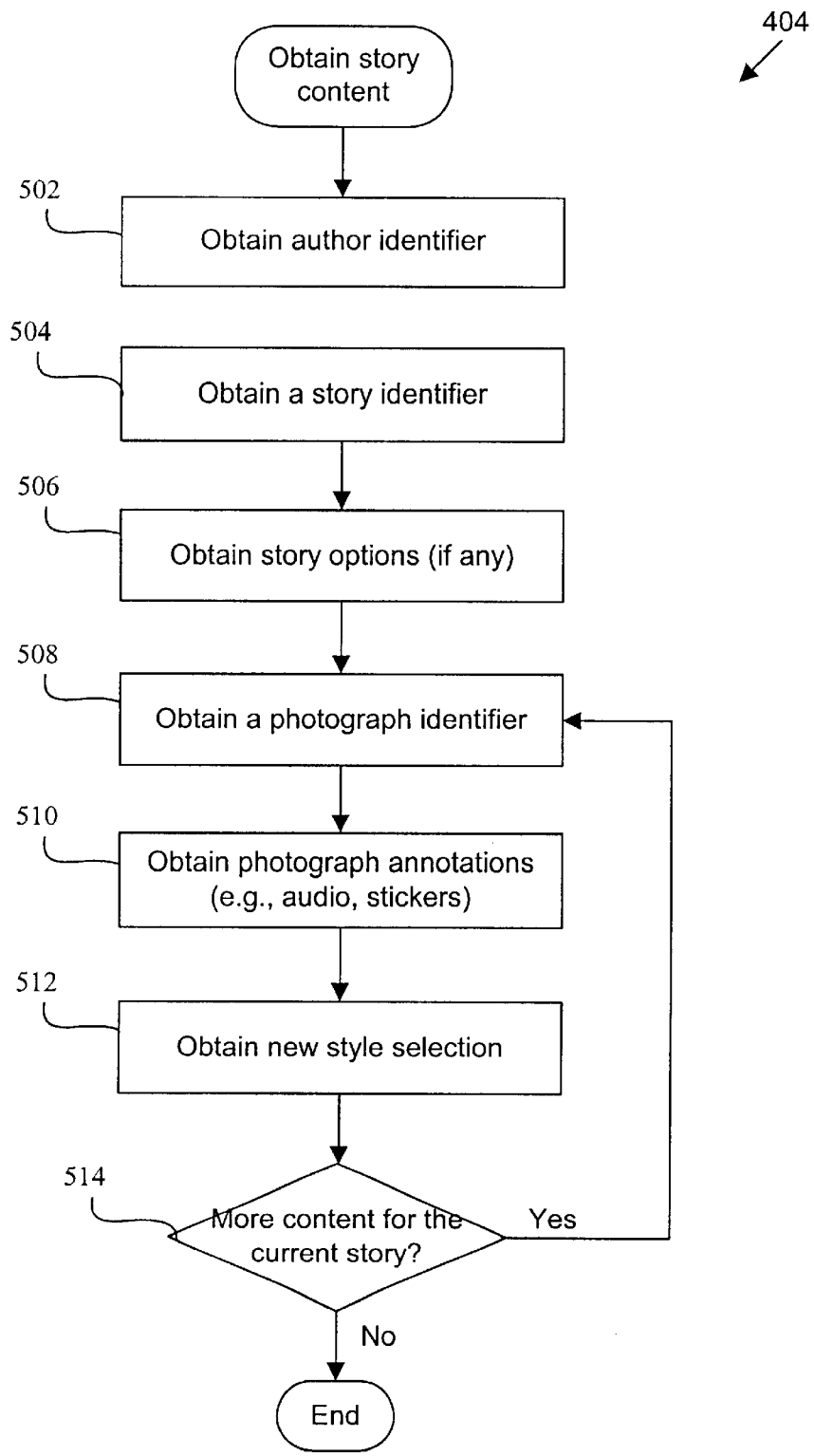
FIG. 5 is a flow chart illustrating the operation of obtaining story content of a story in accordance with one embodiment of the present invention

FIG. 5 is a flow chart illustrating the operation 404 of obtaining story content in accordance with one embodiment of the present invention. In one embodiment, the wand has two modes of use, authoring and playback mode. The wand may include any suitable mechanism for switching between the authoring mode and the playback mode (e.g., a button). Alternatively, the authoring mode may be the default mode of the wand. That is, authoring may be commenced by simply using the wand to scan a barcode. The wand may also include mechanisms for notifying the user that she has entered the authoring mode. For example, a colored light (e.g., orange) may turn on after the authoring mode is activated, and a different colored light (e.g., purple) may turn on after the playback mode is activated.

In the authoring mode, the author may enter content identifiers for the current story. For example, identifiers may be entered for the story itself and a plurality of photos and associated auditory content. The identifiers for each story component may be entered in any suitable order. In the illustrated embodiment, an author identifier is initially obtained in operation 502. For example, the author uses the wand to scan her author card's barcode. The author's barcode number is added to the current edit list. The barcode uniquely identifies the author. Of course, an author card may not have to be scanned, for example, if the author is identified by some other mechanism. The story identifier is then obtained in operation 504. For example, the author scans an unused story barcode from the photo story book. The story's barcode number is added to the current edit list. The story barcode uniquely identifies the current story. Alternatively, a story barcode may be temporarily assigned until a user selects a story barcode. If the user does not select a story barcode, the temporarily assigned barcode becomes the story barcode (e.g., when the story is uploaded).

Story options may then be obtained in operation 506. For example, a style barcode is scanned and added to current edit list. The author may be allowed to select from any number of options regarding how the story is later presented. In one embodiment, the author may select a graphic layout to be displayed with each photo of the story. The graphic layout may include a border that is displayed around each photo, as well as a song that is played while the photos are being displayed. For example, the border may be festooned with confetti and birthday cake art, and the "Happy Birthday" song may play quietly in the background. Of course, selection of a style may also be optional. If the author does not select a style, a default style is applied when the photos are presented for a story.

A photograph identifier may then be obtained in operation 508. For example, the author uses the wand to scan a barcode of a selected photo. The photo barcode number is also added to the current edit list. The photo barcode corresponds to a particular digital image file within the media database 203. In other words, the photo barcode encodes a number that functions as a reference (through information stored in the relational database) to an image file.

A photo annotation may also be obtained in operation 510. Photo annotations generally associate additional information with the preceding photo. Alternatively, the annotation may be applied to the following photo; The annotation may affect how the photo is later displayed. In one embodiment, the author may record a voice message to be played when the photo is displayed. In another aspect, the author may associate a tag with the photo that facilitates searches of groups of related photos. In one embodiment, the author scans a tag barcode that corresponds to a particular theme. For example, the author may associated a "birthday tag" with all photos taken at birthday parties. The author may associate multiple tags with a single photo. The tag barcode number(s) are also added to the edit list.

A new style (e.g., that differs from the default style or previously selected style) may then be obtained in operation 512. That is, the author may change the style associated with the next photos entered as content for the current story. If the author scans a new style barcode, the style barcode number is also added to the current edit list. In one embodiment, a first selected style will be applied to all photos that follow the selected style and precede a second style that is selected. For example, the default style is applied to the first and second photo when no style is selected prior to scanning the barcodes for the first and second photos. If a first style barcode is scanned after the second photo barcode is scanned, the first style is applied to the third photo. The first style is also applied to the fourth and fifth photo if no new style barcode is scanned prior to scanning the fourth and fifth photo barcode. If a second style barcode is scanned after the fifth photo barcode, the second style is applied to any photo barcode that is subsequently scanned until a new third style barcode is scanned for the current story (if any).

It is then determined whether there is more content to obtain for the current story and edit list in operation 514. If there is more content, a next photo identifier is obtained in operation 510. If there is no more content, the operation for obtaining story content ends.

The edit list may take any suitable form for organizing data. The edit list may include tags for each story and each story component. For example, the edit list may be an XML or HTML file. Of course, the XML format may be easily converted to any relational database format, such as SQL, when the edit list is transferred to relational database 202. Conversion of XML to SQL format is well known to those skilled in the art.

FIG. 6 illustrates an example of a XML story element 601 and its associated XML content elements in accordance with one embodiment of the present invention. The story element 601 has a pair of associated "story" tags that delimit the story information. The story information is mostly in the form of pointers to other elements. The first pointer within the story element 601 is an author pointer having a value of "999". The author pointer references a unique author element 603 within the database. The author element 603 contains author information, such as the author's name and email address (not shown). The next item of the story information is a date stamp indicating when the story element was created or last modified.

The next set of pointers are surrounded by a pair of "links" tags. These pointers reference media content of the story, such as image and audio files. The first pointer references an element having an I.D. value of "1234." This I.D. value corresponds to photo element 605. The photo element also includes an author pointer, data stamp, and three pointers to three image files. In one embodiment, the three image files correspond to the same photo, but have differing resolution values. Different resolution image files may be accessed for different display applications. For example, several photo images may be displayed together on one computer screen as a result of a search. In this case, a smaller sized, low resolution thumbnail image is displayed for each photo image. In contrast, when a single photo is displayed as part of a story, a larger sized, high resolution image is displayed.

The next pointer within the story information 601 references an element having an I.D. value of "3256," which corresponds to audio element 607. Of note, this pointer has a numerical reference type (nref) and a contextual numerical reference type (cnref). The nref pointer corresponds directly to elements in the database, and the cref pointer indicates an element that is associated with the nref pointer. In the illustrated embodiment, the audio clip of audio element "3256" plays when the image file of photo element "1234" is displayed.

The photo story information may also include references to style elements. The style elements may themselves also have references to image and/or audio files, as well as any other type of displayable or executable file. By way of another example, the style element may reference a video clip. The style can also have information regarding the way the photos comes into view (e.g., panning from one edge of the screen to the center). By way of another example, the style may indicate a grouping of the photos into sets (e.g., display shows three images at a time).

Referring back to FIG. 4A, after the content for the first story is obtained, it is then determined whether the author wishes to generate any more stories in operation 406. The author may indicate that she wishes to author more stories in any suitable manner. For example, the wand may be configured with a "new story" button and the docking bay 116 with a "down load" button. The author indicates that she desires a new story by pressing the "new story" button. The author indicates that she is finished authoring stories by placing the wand into the docking bay 116 and pressing the "down load" button on the docking bay. Alternatively, a docking cable is coupled to a computer port and an application program uploads the story information, for example, via a user interface.

If more stories are indicated, the current edit list for the completed story is then saved (e.g., within the wand's memory) in operation 408. A next edit list is then opened in operation 402, and the story content for the next story is then obtained in operation 404. If no more stories are indicated, the authoring process 400 ends. The edit lists for the authored story(s) may continue to be stored within the wand until they are downloaded to the author's computer and/or distributed to the relational database 202 and the media database 203. The story content may be distributed in any suitable manner that allows the content to be accessed and displayed.

FIG. 4B is a flow chart illustrating a process 450 for distributing one or more stories in accordance with one embodiment of the present invention. This distribution process 450 may be in any suitable form, e.g., software residing on the client computer 100 and/or any of the web servers 352. Newly created stories (e.g., stories stored within the wand) or previously completed stories (e.g., stories that have already been downloaded to relational database 202) may be distributed to any suitable destination for later viewing. A completed story that is stored within either the wand or relational database may be sent via email, or a completed story that is stored within the wand may be distributed from the wand to the relational database, where the story is then accessible via the author's web site.

As shown in FIG. 4B, it is initially determined whether there is a request for distribution of one or more new story(s) in operation 452. If there is not a request for distribution of a new story, it is then determined whether there is a request for distribution of one or more old story(s). The distribution requests may take any suitable form. For example, a distribution request to distribute new stories to a secure web site may be indicated by placing the wand within the docking bay 116 and pressing the "download" button of the docking bay. By way of another example, an authorized user may make a distribution request through any suitable graphical interface. For example, the graphical interface may include an email button for indicating that email distribution of old stories is desired.

If there is an old story distribution request, selection of one or more old story(s) is then obtained in operation 456. For example, the user may be presented with a list of stories from which to make her selection. The list may be filtered to ensure security. For example, each user may only be able to distribute stories that she authored herself. In one embodiment, the user has to enter or scan her author barcode number, and stories are displayed that are associated with the user's author identifier.

Selection of one or more destination(s) for distribution of the selected stories is then obtained in operation 458. For email distribution, one or more email addresses may be selected. If this is a new story distribution request, the new story(s) are downloaded in operation 462, and the selected destination is the relational database 202. After obtaining the destination, the stories are then submitted to the selected destination(s) in operation 460.

After one or more story(s) have been distributed to a destination (sent to email address or added to the relational database), selected stories may then be displayed at a viewer computer display, for example. Alternatively, the selected story may be displayed through a viewer's television screen. Email distribution is optional. In one embodiment, stories are sent to the relational database, but not distributed via email. After the story is downloaded (or uploaded) to the relational database, an email containing a URL to the story may then be sent to another person or receiver. The email receiver then clicks on the URL to display the associated story, for example, via the receiver's browser software. In this case, the story record is not sent to the receiver by email, just the URL reference.

Any other suitable mechanism may be implemented for accessing and displaying a completed story. FIG. 4C is a flow chart illustrating a process 470 for displaying a completed story in accordance with one embodiment of the present invention. The display process 470 may take any suitable form, e.g., software residing on either of the web/database servers 352. Initially, it is determined whether a story is selected for playback in operation 472. For example, an authorized user may select a story from a list of stories that are referenced on the author's web site.

When a story is selected for playback, the first photo of the selected story is displayed in operation 474. For example, the image file associated with the first photo element is accessed and displayed within the author's web page. If there is any associated audio element, the corresponding audio clip is also played along with the displayed photo.

It is then determined whether there is a style change in operation 476. In other words, is a particular style associated with the next displayed photos. In one embodiment, it is determined whether there is a style element following the first photo element within the story information. If there is a style change, the style of the next photo is changed from the default style to the new style in operation 478 (e.g., via accessing the corresponding stylesheet). If there is not style change, it is then determined whether user control has been initiated in operation 480. For example, the photo story book may include control barcodes for controlling playback of the story. The photo story book may include any number of control barcodes, such as a barcode to display the previous or next photo, a barcode to stop playback, and a barcode to continue playback.

If user control has been initiated, a photo is then displayed based on the specified user control in operation 482. For example, the previous photo is displayed if the "previous photo" barcode is scanned. It is then again determined whether there is user initiated control in operation 480. If user control is initiated, another photo is displayed based on the user control in operation 482. For example, the next photo is displayed if the "continue playback" barcode is scanned.

If control has not been initiated, the next photo is displayed in operation 474 if it is determined that it is not the end of the story in operation 481. If it is the end of the story, the display process 470 ends. Otherwise, photos are displayed in sequence until last story is displayed.

Security mechanisms may also be provided for access to stories and photos within the relational database. In one embodiment, each story and photo element is associated with an author I.D. This author I.D. may correlate with a list of authorized users and a password. The password is used by others to access the associated stories and photos, for example, via the author's web site.

Stories and photos referenced within the relational database are selectable and displayable by authorized users. For example, a user may use the wand in playback mode to scan a photo or story barcode. Alternatively, a user may use a keyboard, mouse, remote control or any other input device to select and display a photo or story. Any suitable mechanisms may be utilized for accessing a particular story or photo via the relational database 202 after a user has selected a specific story or photo, and perhaps a style for displaying such story or photo. For example, the stories may be stored as story elements within the relational database, and the story elements are accessed via standard database commands, such as SQL. That is, when accessing a story, the web server attached to the database reconstitutes an XML description out of the story elements. The XML description is then filtered and converted through the use of XSL style sheets into HTML and sent to the user's browser. The database elements may be accessed in any suitable manner. In one embodiment, elements within relational database 202 and their corresponding media files in media database 203 are accessed according to an interaction grammar that is delivered via a standard web browser. The format is as follows:

[action]tokens* [style]

The most common action is "submit" which indicates a query for a particular element of the database. The token may represent any element within the database, such as a photo or audio element. The style portion is optional and is described further below. By way of example, when a user scans the barcode of story #5678, the web server for the relational database 202 is sent the URL http://server.legacv.com/submit.asp?5678. The server responds with a database record corresponding to id #5678. Furthermore, since the database knows that id 5678 is a story, the default XSL stylesheet for stories will be applied to convert the raw data into a presentable format (e.g., HTML).

Optional style information can be added to a database query. If a user desires to view story #5678 using style #9236, they could send the query http://server.legacy.com/submit.asp?5678+9236. In this case, the server responds with a database record for #5678 (a story). However, rather than using the default presentation style for stories, the style #9236 is applied to give the story alternative formatting. For example, the user scans the style barcode #9236 and then the story barcode #5678.

By way of another example, when a user scans the barcode associated with the I.D. for the "search" action (2836), then the "Christmas" tag (8712), and finally the I.D. for a particular presentation style (9236), the query http://server.legacv.com/submit.asp?2836+8712+9236 is sent to the web/database server. This query indicates that a search is to be performed in the relational database 202 for all items tagged with the Christmas I.D. (#8712) using presentation style #9236. The server responds with a database record for I.D. #8712. The XSL stylesheet contained in element #9236 will be applied to convert the raw XML record description into a presentable format (e.g., HTML).

Commands may also be submitted to change the currently displayed context (e.g., current story). By way of another example, the user may submit query http://server.legacy.com/submit.asp?5678. Story #5678 is now the current context. If the user submits a new query for a presentation style, e.g., http:H/server.legacy.com/submit.asp?9236, the database responds with the database record for the current context (story #5678) using formatting information contained in style #9236.

Compound submissions are also possible. In order to find all photos associated with both a Christmas tag (#8712) and a Grandma tag (#2209), the user scans both barcodes, resulting in the query http://server.legacy.com/submit.asp?8712+2209. The server responds with the database records of all photos flagged with both the Christmas number and the Grandma number.

Some actions may not work directly on the database. For example, an "Overview" style may display a matrix of tokens on-screen. For example, the overview display may consist of thumbnail images from a particular story. The user can access larger views of each image by swiping the wand over similarly placed barcodes on a controller card within the photo story book. If the thumbnail image in the upper left corner of the matrix corresponds to photo #7622, the appropriate server query to access that photo is http://server.legacy.com/submit.asp?7622. However, the controller card for the Overview style may have fixed I.D. numbers corresponding to each position in the matrix (rather than items on screen). When the upper left item on the card is scanned (e.g., with I.D. #1121), the following query http://server.leiacy.com/submit.asp?1121 is sent to the server.

For this particular set of thumbnail images (the current context), I.D. #1121 should correspond to I.D. #7622. Thus, I.D. #1121 is an "indirect action". Indirect actions may create a table of equivalencies, and tell the server how to modify its query based on the current context. So for the example above, the table might look something like:

1121=7622

1122=7499 etc . . .

By swiping #1121 the indirect action redirects the server to point to #7622. When presenting a different set of items in the Overview style, indirect actions like #1121 might produce a different set of equivalencies entirely.

Although the foregoing invention has been described in some detail for purposes of clarity of understanding, it will be apparent that certain changes and modifications may be practiced within the scope of the appended claims. For instance, although the present invention has been described in terms of using barcodes to identify physical object, of course, other identification mechanisms may be implemented, such as RF tags, magnetic tags, and contact tags. Therefore, the described embodiments should be taken as illustrative and not restrictive, and the invention should not be limited to the details given herein but should be defined by the following claims and their full scope of equivalents.

What is claimed is:

1. An apparatus for organizing photographs, each photograph being digitized and stored within a database, each digitized photograph having an associated identifier, each identifier also being in a physical form that is readable by an input device, the apparatus comprising:

an input device having an image reader arranged to read a user-configurable edit list for authoring a story and including one or more identifiers that include one or more photo identifiers associated with selected photographs and a style identifier indicating how the photographs are to be displayed, a data recorder arranged to receive annotation data related to each digitized photograph, and a memory device arranged to store information based on such reading and receipt;

an interface device arranged to transfer the stored information from the input device to the database such that the photographs that correspond to the stored information are accessible and displayable.

2. An apparatus as recited in claim 1, wherein the annotation data is audio data.

3. An apparatus as recited in claim 2, wherein the data recorder is a sound recorder.

4. An apparatus as recited in claim 2, further comprising a sound output device arranged to output the received annotation data as sound.

5. An apparatus as recited in claim 1, wherein the image reader is a barcode reader and the photo identifiers are barcodes.

6. An apparatus as recited in claim 1, wherein the image reader is a camera and image recognizer.

7. An apparatus as recited in claim 1, wherein the input device further include a processor configured to correlate the annotation data with selected identifiers and to compile the edit list of read photo identifiers and references to the annotation data.

8. An apparatus as recited in claim 1, wherein at least one of the identifiers is an author identifier that identifies a user of such input device.

9. An apparatus as recited in claim 1, wherein at least one of the identifiers is a story identifier that corresponds to a set of read photographer identifiers.

10. A data structure suitable for storing information useful in displaying photographs, the data structure being embodied in a computer readable media and comprising:

a plurality of photograph elements each having a photograph identifier and a reference to a digitized photograph that is associated with the photograph identifier; and a plurality of story elements each having a story identifier and one or more photograph identifiers, wherein the story elements correspond to selected digitized photographs that are played when the corresponding story element is accessed and at least one of the story elements includes a style reference indicating how a digitized photograph of the corresponding story element is to be displayed, and the story elements are compiled as a user-configurable edit list for authoring a story.

11. A data structure as recited in claim 10, further comprising a plurality of audio elements each having an audio identifier and a reference to an audio file.

12. A data structure as recited in claim 11, wherein at least one of the story elements also includes a selected audio identifier.

13. A data structure as recited in claim 12, wherein the selected audio identifier within the story elements is associated with one or more photo identifiers to indicate that the selected audio identifier's corresponding audio file is to be played while displaying the associated one or more photo identifiers' digitized photographs.

14. A method of organizing photographs off-line, each photograph being digitized and stored within a media database, the method comprising:

providing a representation of each digitized photograph, each representation being readable by an input device to identify the corresponding digitized photograph;

providing a user-configurable edit list for authoring a story and including a style identifier indicating how the photographs are to be displayed, the edit list being readable by the input device;

off-line from a computer, receiving a selected one of the representations into the input device whereby the representation is stored within the input device; and transferring the representation within the input device to a story database in a format that is accessible to display the corresponding digitized photograph.

15. A method as recited in claim 14 further comprising receiving a plurality of representations into the input device so that the corresponding digitized photographs are organized into a photo story and transferring the representations to the story database in a format that is accessible to thereby display the corresponding digitized photographs.

16. A method as recited in claim 15 further comprising receiving an audio message into the input device and transferring a representation of the audio message to the story database and the audio message is transferred to the media database.

17. A method as recited in claim 16 wherein the audio message is associated with the lastly input representation of a digitized photograph.

18. A computer program product for organizing photographs off-line, each photograph being digitized and stored within a media database, the computer program product comprising:

at least one computer readable medium;

computer program instructions stored within the at least one computer readable medium for causing a processing device to:

providing a representation of each digitized photograph, each representation being readable by an input device to identify the corresponding digitized photograph;

providing a user-configurable edit list for authoring a story and including a style identifier indicating how the photographs are to be displayed, the edit list being readable by the input device;

off-line from a computer, receiving a selected one of the representations into the input device whereby the representation is stored within the input device; and transferring the representation within the input device to a story database in a format that is accessible to display the corresponding digitized photograph.

19. An authoring system for presenting a story about tagged physical objects on an accessible computer site, the authoring system comprising:

means for selecting a plurality of the tagged objects and a user-configurable edit list for authoring a story and including a style identifier to be included within a story;

means for converting the selections into representations of the selected tagged objects and grouping the representations together to thereby form the story; and means for transferring the story to the computer site so that a user may access the computer site and view the story and its associated representations of the tagged objects;

wherein the style identifier indicates how the selected objects are to be displayed.

20. An authoring system for presenting a story about tagged physical objects on an accessible computer site, the authoring system comprising:

a reader arranged to read selected tags of the tagged objects and a user-configurable edit list for authoring a story and including a style identifier;

a processor arranged to convert such selections into a story element having object identifiers associated with the selected tagged objects, the object identifiers corresponding to images and the group forming a story about the selected tagged objects; and computer interface arranged to transfer the story element to the computer site so that a user may access the computer site and view the story element's associated images;

wherein the style identifier indicates how the photographs are to be displayed.

21. An authoring system as recited in claim 20 further comprising a data recorder arranged to receive other data, wherein the processor is further configured to associate the other data with one or more object identifiers such that the other data is presented with corresponding images of the associated object identifiers.

22. An authoring system as recited in claim 21 wherein the other data is audio data.

* * * * *